Feb. 19, 1963  J. VAN DER WILT  3,077,738
SAFETY DEVICE FOR AUTOMOTIVE BRAKES
Filed July 31, 1961

INVENTOR.
Joe Van Der Wilt
BY Sam J. Slotsky
ATTORNEY

United States Patent Office 3,077,738
Patented Feb. 19, 1963

3,077,738
SAFETY DEVICE FOR AUTOMOTIVE BRAKES
Joe Van Der Wilt, 10262 Strathern St.,
Sun Valley, Calif.
Filed July 31, 1961, Ser. No. 128,198
2 Claims. (Cl. 60—54.5)

My invention pertains to a safety device for automotive brakes.

An object of my invention is to provide a device which can be inserted within the hydraulic circuit of automotive brakes, which device will automatically compensate for the wear on the brakes, so that the braking effect will be uniform at all times.

A further object of my invention is to provide an arrangement which is positive in operation.

A further object of my invention is to provide a device in which the compensating features will be automatically provided merely upon actuation of the brake pedal.

Figure 1:
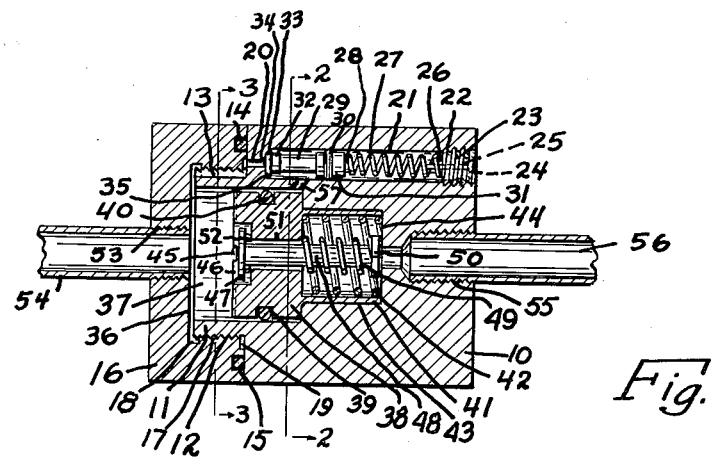
Figure 2:
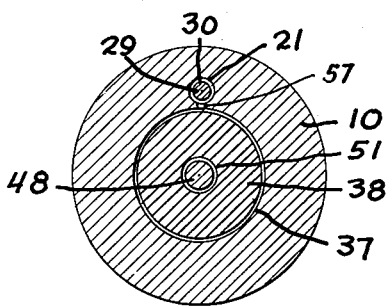
Figure 3:
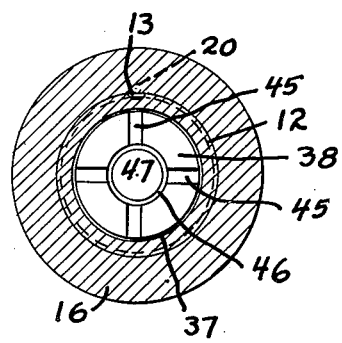

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a sectional view taken generally along the longitudinal axis of the device, FIGURE 2 is a sectional view taken along the lines 2—2 of FIGURE 1, and FIGURE 3 is a sectional view taken along the lines 3—3 of FIGURE 1.

My invention contemplates the provision of a device which will insure that regardless of the wear on the brake surfaces of automotive brakes, the device will compensate for the same and will insure that the braking operation will be uniform at all times, and which device will also provide features wherein any excess of the oil in the hydraulic circuit will pass to certain by-pass oil circuits whereby the effect will be uniform at all times.

In describing my invention I have used the character 10 to designate a cylindrical block including the integral extending portion 11, which portion 11 is threaded as at 12, the character 13 indicating a passageway which is formed in the threads.

I have further used the character 14 to indicate a ring-shaped circular-in-cross-section rubber gasket which is received within the annular channel 15, this channel 15 being formed in the cap member 16 which includes the threads 17, which threads threadably engage the threads 12, the cap 16 also including an annular groove at 18.

Formed on the inner surface of the cap 16 is an annular groove 19, and communicating with the groove 19 is a small opening 20, which communicates with a larger longitudinal opening 21, and threadably engaged with the end of the opening 21 at 22 is a small screw 23 having the slot 24 for turning the same, the screw 23 including the small opening 25, and the screw 23 also extending into the further portion 26. Receiving the portion 26 is a coiled helical spring 27 which receives the end 28 of a piston member 29, which piston member includes a ring-shaped gasket 30, which gasket 30 is snugly received within the opening 21, the gasket 30 being positioned between the expanded portions 31. The piston 29 is of lesser diameter than the longitudinal opening 21, and includes a further portion 32 which is positioned adjacently to a further ring-shaped gasket 33 which is held by means of the portion 34, the gasket 33 being adapted to be tightly engaged against the tapered surface 35 when the piston 29 is in the position shown in FIGURE 1.

The portion 11 is normally slightly spaced from the wall 36 of the cap member 16. The portion 11 includes the opening 37, and received in the opening 37 is a piston 38 having the groove 39 therein, which groove receives a ring-shaped circular-in-cross-section gasket 40 which is adapted to bear against the walls of the opening 37. Extending from the piston 38 is the cylindrcal portion 41 which receives a helical compression spring 42 which bears against the piston member 38, and also formed in the block 10 is a further opening 43 which receives the portion 41, the spring 42 bearing against the surface 44.

The piston member 38 includes the transverse grooves 45, which merge with the centrally positioned cylindrical cavity 46, and received in the cavity 46 is a circular disc member 47 which continues integrally into a stem 48, which stem is received within a further smaller helical compression spring 49 which bears against the nut 50, which is attached to the end of the stem 48, this stem 48 also passing through an opening 51 provided in the piston element 38. The character 52 indicates an annular gasket positioned adjacently to the portion 47.

Connected at 53 to the cap 16 is the tube 54 which passes to the brake, and connected to the block 10 at 55 is the further tube 56 which passes to the brake pedal arrangement.

The character 57 indicates a small opening communicating between the opening 21 and the larger opening 37.

The device operates in the following manner.

The amount of oil contained in the opening or space 37 between the end of the piston 38 and the wall 36 usually is the normal amount when the brakes are in normal condition. Therefore, under such normal conditions, when the foot pedal is pressed, the oil passing through the tube 56 will cause the piston 38 to travel toward the left the pre-set amount which is estabʼished between the end of the piston 38 and the wall 36. During this normal action the rod 48 and disc 47 will remain in fixed position relative to the piston 38. However, if the oil supply at 37 is depleted due to the wearing away of the brake bands, etc.; when the foot pedal is pressed, the disc 47 will move toward the left and the gasket 52 will unseal the opening 51, aʼlowing more oil to enter into the space at 37 and if desired, the foot pedal can be merely pumped once or twice to refill this space which oil supply will then re-establish the same normal action to the brake drums regardless of the wearing of the same.

Also, any excess oil will pass through the space between the end of the portion 11 and the wall 36, and along the passageway 13, and thence into the opening 20, and the piston 29 will be forced to the right against the spring 27 allowing the excess oil to pass through the opening 57, and into the cylindrical opening 37 where upon this oil pressure at the right hand side of the piston 38 will in effect balance the pressure at the left hand side, whereby the correct oil pressure will be re-established at both sides of the piston, so that regardless of the conditions, the brake drums will always be at the same effective distance from the brake bands, and in this manner there will be provided a compensating feature which automatically adjusts the braking action to normal.

The pressure on the spring 27 can be regulated as desired by means of the set screw 23 which can be turned in either direction to weaken or strengthen the spring pressure, the opening 25 allowing an air passage so that air pressure will not be built up unduly in the opening 21.

The grooves 45 provide an important function in that when the face of the piston 38 bears against the wall 36, a vacuum or suction affect will not occur, which if it did occur, would prevent the piston 38 from returning to its normal position, these grooves 45 relieving the vacuum effect at this point.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A safety device for automotive brakes comprising a cylindrical block, a cavity in said block, a piston received in said cavity, a centrally positioned loosely fitted valve member received in said piston, a cap engaged with said block, a hydraulic tube attached to said block and communicating therewith and with a vehicle brake, a further hydraulic tube communicating with said cap and with the brakes of a vehicle, wearing of said brakes being adapted to cause a diminution of the oil supply between the outer end of said piston and said cap, and whereby oil pressure against said piston will cause said centrally positioned valve member to open to release additional oil into the space between said piston and said cap, said piston including an integral cylindrical inwardly extending portion, said block including a further cavity for receiving said integral cylindrcal extendng portion, a spring received in said integral extending portion adapted to bear against said piston, said block including an outwardly extending further portion, said cap being attached to said outwardly extending further portion, a passageway in said outwardly extending further portion, a lengthened opening positioned substantially parallel to the axis of said piston communicating to said passageway, a further valve member received in said lengthened opening, a further smaller passageway communicating from said lengthened opening and to said piston whereby oil will flow from said smaller passageway to the annular chamber formed when said piston is moved toward said cap, a further spring bearing against said further valve member, an adjustable screw bearing against said further spring, said adjustable screw having an air outlet opening.

2. A safety device for automotive brakes comprising a cylindrical block, a cavity in said block, a piston received in said cavity, a centrally positioned loosely fitted valve member received in said piston, a cap engaged with said block, a hydraulic tube attached to said block and communicating therewith and with a vehicle brake, a further hydraulic tube communicating with said cap and with the brakes of a vehicle, wearing of said brakes being adapted to cause a diminution of the oil supply between the outer end of said piston and said cap, and whereby oil pressure against said piston will cause said centrally positioned valve member to open to release additional oil into the space between said piston and said cap, said piston including an integral cylindrical inwardly extending portion, said block including a further cavity for receiving said integral cylindrcal extendng portion, a spring received in said integral extending portion adapted to bear against said piston, said block including an outwardly extending further portion, said cap being attached to said outwardly extending further portion, a passageway in said outwardly extending further portion, a lengthened opening positioned substantially parallel to the axis of said piston communicating to said passageway, a further valve member received in said lengthened opening, a further smaller passageway communicating from said lengthened opening and to said piston whereby oil will flow from said smaller passageway to the annular chamber formed when said piston is moved toward said cap, a further spring bearing against said further valve member, an adjustable screw bearing against said further spring, said adjustable screw having an air outlet opening said piston having transverse grooves on the outer face thereof and where said face abuts against said cap to prevent adherence of said piston with said cap.

References Cited in the file of this patent

UNITED STATES PATENTS

| | | |
|---|---|---|
| 697,140 | Goldschmidt | Apr. 8, 1902 |
| 1,569,143 | Robinson | Jan. 12, 1926 |
| 2,544,849 | Martin | Mar. 13, 1951 |
| 2,591,793 | Dubois et al. | Apr. 8, 1952 |
| 2,924,945 | Oswalt | Feb. 16, 1960 |

FOREIGN PATENTS

| | | |
|---|---|---|
| 374,150 | Great Britain | June 6, 1932 |